(12) United States Patent
Weich et al.

(10) Patent No.: US 9,544,621 B2
(45) Date of Patent: Jan. 10, 2017

(54) IDENTIFICATION OF CAPTURED VIDEOS

(71) Applicant: Google Inc., Mountain View, CA (US)

(72) Inventors: Thomas Weich, Zurich (CH); David Erb, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/489,402

(22) Filed: Sep. 17, 2014

(65) Prior Publication Data

US 2016/0080781 A1    Mar. 17, 2016

(51) Int. Cl.
| | |
|---|---|
| *H04N 21/23* | (2011.01) |
| *H04N 21/234* | (2011.01) |
| *H04N 21/4223* | (2011.01) |
| *H04N 21/4722* | (2011.01) |
| *H04N 21/239* | (2011.01) |
| *H04N 21/81* | (2011.01) |
| *H04N 21/6543* | (2011.01) |
| *H04N 21/858* | (2011.01) |
| *G06K 9/00* | (2006.01) |
| *H04N 21/278* | (2011.01) |
| *G06F 17/30* | (2006.01) |

(52) U.S. Cl.
CPC .. *H04N 21/23418* (2013.01); *G06F 17/30784* (2013.01); *G06K 9/00744* (2013.01); *H04N 21/2393* (2013.01); *H04N 21/278* (2013.01); *H04N 21/4223* (2013.01); *H04N 21/4722* (2013.01); *H04N 21/6543* (2013.01); *H04N 21/8133* (2013.01); *H04N 21/858* (2013.01)

(58) Field of Classification Search
None
See application file for complete search history.

(56) References Cited

U.S. PATENT DOCUMENTS

| | | | |
|---|---|---|---|
| 8,259,177 B2 | 9/2012 | Gits et al. | |
| 8,655,056 B2 | 2/2014 | Singh et al. | |
| 2007/0101269 A1* | 5/2007 | Hua | G06F 17/30811 715/723 |
| 2007/0250881 A1* | 10/2007 | Clapper | H04N 7/163 725/102 |
| 2009/0154806 A1 | 6/2009 | Chang et al. | |

(Continued)

FOREIGN PATENT DOCUMENTS

EP    2391122 A1    11/2011

OTHER PUBLICATIONS

PCT International Search Report and Written Opinion for PCT/US2015/044663, Oct. 6, 2015, 10 Pages.

*Primary Examiner* — Cai Chen
(74) *Attorney, Agent, or Firm* — Fenwick & West LLP (57) ABSTRACT

An identification system receives a request from a user device to identify a video captured in a video stream. The identification system identifies a display area captured in the video stream in which the video is displayed. The identification system identifies content include in the display area throughout the stream. Based on the identified content, the identification system creates a fingerprint for the video. The identification system identifies from a plurality of stored fingerprints at least one fingerprint similar to the created fingerprint. The identification system identifies video information associated with the similar fingerprint. The video information is transmitted to the user device and displayed as being video information about the video captured in the stream.

17 Claims, 4 Drawing Sheets

(56) References Cited

U.S. PATENT DOCUMENTS

| | | |
|---|---|---|
| 2010/0049711 A1 | 2/2010 | Singh et al. |
| 2011/0216937 A1 | 9/2011 | Radhakrishnan et al. |
| 2011/0311095 A1* | 12/2011 | Archer ............... G06K 9/00744 |
| | | 382/100 |
| 2012/0033876 A1* | 2/2012 | Momeyer et al. ................. G06F 17/30781 |
| | | 382/165 |
| 2014/0044355 A1 | 2/2014 | Haritaoglu |
| 2014/0236988 A1 | 8/2014 | Harron et al. |

* cited by examiner

IDENTIFICATION OF CAPTURED VIDEOS

BACKGROUND

Field

Described embodiments pertain in general to videos systems, and in particular to the identification of videos.

Description of the Related Art

On a daily basis media is presented to people everywhere they go. For example, when a person goes to a shopping mall, the person may see video ads for new products, movie trailers, music videos, etc. If a person sees a video that is playing and is interested in it, the person may want to obtain certain information about the video, such as the name of the video and where it can be found. However, in certain circumstances obtaining such information may be difficult. Continuing with the shopping mall example from above, assume the person is at a store and passes a television display that is showing an interesting movie. The person would like to rent the movie and needs to know the name of the movie but the name is nowhere to be found. The person could ask other shoppers at the store or an employee of the store for the name of the movie. However, asking someone may be embarrassing to the person, may take a long time (e.g., searching for an employee at the store) and whoever the person asks may not know the name of the movie.

SUMMARY

Described embodiments provide methods, computer program products, and systems for identifying videos captured in video streams. When a user is watching a video and would like more information about the video (e.g., the name of the video and information for accessing the video), the user uses a user device 102 to create a video stream that captures playback of a portion of the video. The user device 102 transmits the video stream to an identification system and requests identification of the video captured in the video stream.

The identification system identifies a display area captured in the video stream in which the video is displayed. For example, the identified display area corresponds to an object (e.g., display of a television) in which the video was displayed during the creation of the video stream. The identification system identifies content included in the display area throughout the stream. The identified content includes content/scenes of the video captured in stream. Based on the identified content, the identification system creates a fingerprint for the video.

The identification system identifies from a plurality of stored fingerprints at least one fingerprint similar to the created fingerprint. The identification system identifies video information associated with the similar fingerprint. The video information may include, for example, a video identifier and a link for accessing a video. The video information is transmitted to the user to describe the video captured in the stream.

The features and advantages described in this summary and the following detailed description are not all-inclusive. Many additional features and advantages will be apparent to one of ordinary skill in the art in view of the drawings, specification, and claims hereof.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
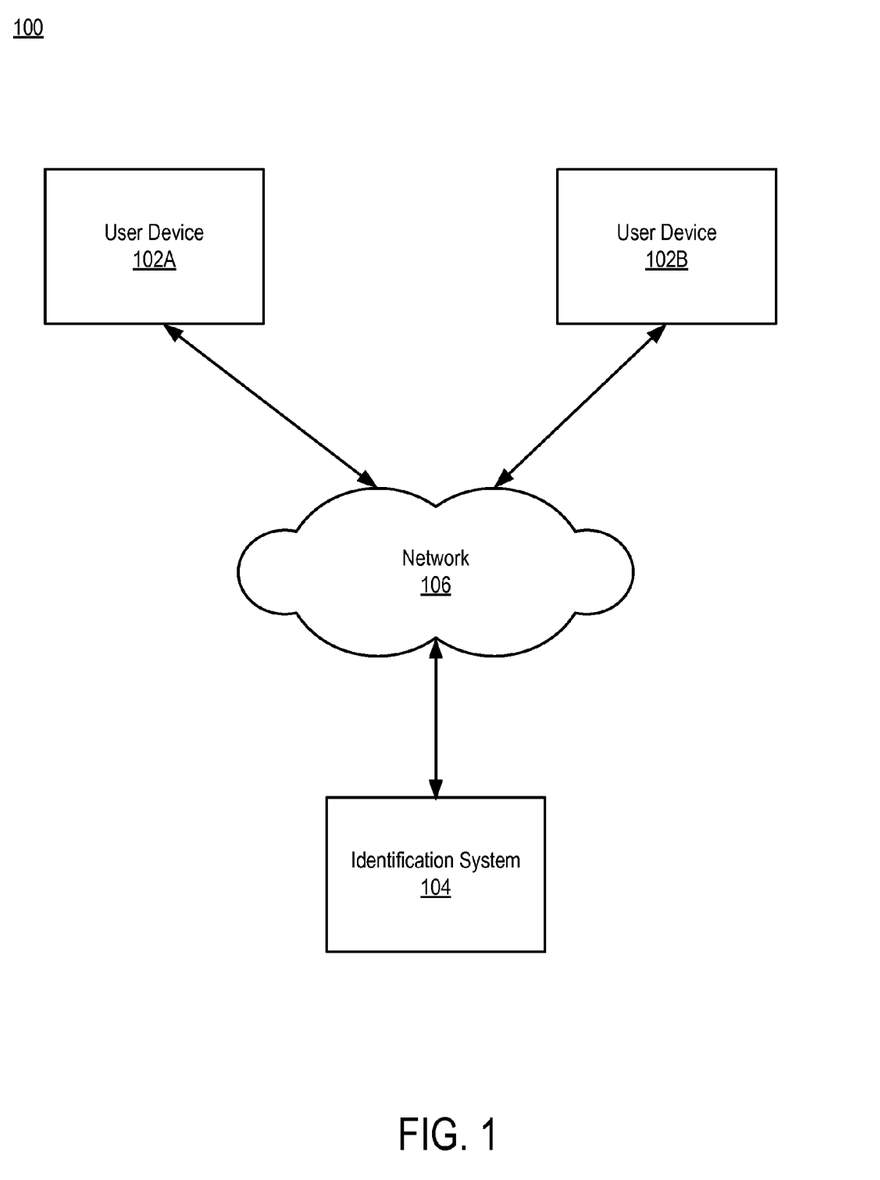
FIG. 1 is a block diagram of a video identification environment according to one embodiment.

FIG. 1 is a block diagram of a video identification environment 100 according to one embodiment. FIG. 1 illustrates user devices 102A and 102B and identification system 104 connected via a network 106. Although a select number of each entity are shown in FIG. 1, embodiments can have more or less of each entity (e.g., additional user devices 102).

FIG. 1 and the other figures use like reference numerals to identify like elements. A letter after a reference numeral, such as "102A," indicates that the text refers specifically to the element having that particular reference numeral. A reference numeral in the text without a following letter, such as "102," refers to any or all of the elements in the figures bearing that reference numeral.

A user device 102 is a device used by a user to request identification of a video captured in a video stream. In one embodiment, a user device 102 includes functionality for creating video streams of objects. A video stream is video content that is comprised of multiple video frames. A user device 102 may be any device with video capturing capabilities, such as a mobile phone, a tablet computer, or a wearable computing device (e.g., glasses or a watch). When a user sees a video being displayed and the user would like more information about the video (e.g., title of the video, author, where the video can be accessed), the user uses a user device 102 to create a video stream of the video. The video stream includes multiple sequenced video frames and captures playback of a portion of the video (captures a sample of the video). In one embodiment, the video stream is 4.5 seconds in length. The video whose playback is captured by the video stream may be, for example, a video provided by a video sharing system that hosts videos uploaded by users. The video may also be a television program or a movie.

In addition to the video stream capturing playback of the video, the stream may also capture other objects that surround the display of the video. For example, if the user is in a living room and records a video being displayed on a television, in addition to the stream created including the television, the stream may also include a chair and a couch that are within the user device's 102 field of view. The user device 102 transmits the video stream to the identification system 104 and requests identification of the video.

In one embodiment, the user device 102 streams video stream to the identification system 104 as it is being created. In another embodiment, the user device 102 transmits the video stream to the identification system 104 once creation of the stream is complete (e.g., when user requests to stop recording).

In one embodiment, instead of the user device 102 creating the video stream, the video stream is created by another device (e.g., a video camera) separate from the user device 102. The video stream is transferred to the user device 102 and the user device 102 transmits the request for identification to the identification system 104 along with the video stream.

The identification system 104 is a computer system that identifies videos captured in video streams. When the identification system 104 receives a video stream with a request for a video captured in the stream to be identified, the identification system 104 identifies a display area captured in the stream in which the video is displayed. The identified area may, for example, correspond to a television display in which the video is displayed.

The identification system 104 identifies content included in the display area throughout the multiple frames of the stream. Based on the content, the identification system creates a fingerprint for the portion of the video that was captured by video stream. The identification system 104 compares the created fingerprint to stored video fingerprints. The identification system 104 identifies at least one stored fingerprint that is similar to the created fingerprint of the video captured in the stream.

The identification system 104 determines a video to which the identified stored fingerprint corresponds and retrieves video information associated with the determined video (i.e., retrieve video information associated with the identified fingerprint), including an identifier of the video. The identification system 104 provides the retrieved information to the user device 102. The information is displayed to the user of the device 102 as being information about the video captured in the stream.

The network 106 represents the communication pathways between the user devices 102 and the identification system 104. In one embodiment, the network 106 is the Internet and uses standard communications technologies and/or protocols. Thus, the network 106 can include links using technologies such as Ethernet, 802.11, worldwide interoperability for microwave access (WiMAX), 3G, Long Term Evolution (LTE), digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc.

The data exchanged over the network 106 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
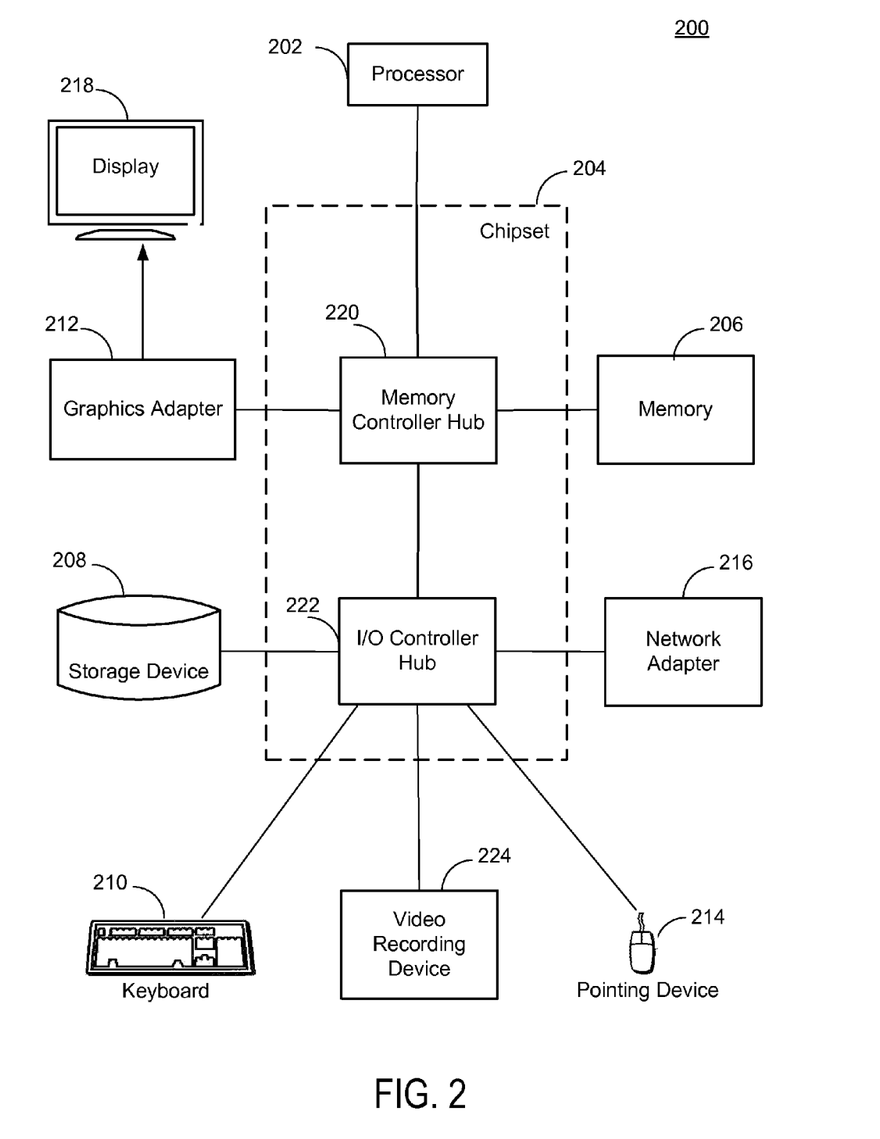
FIG. 2 is a block diagram illustrating a functional view of a typical computer system for use as one of the entities illustrated in the environment of FIG. 1 according to an embodiment.

FIG. 2 is a block diagram illustrating a functional view of a typical computer system for use as one of the entities illustrated in the environment 100 of FIG. 1 according to an embodiment. Illustrated are at least one processor 202 coupled to a chipset 204. Also coupled to the chipset 204 are a memory 206, a storage device 208, a keyboard 210, a graphics adapter 212, a pointing device 214, a network adapter 216, and a video recording device 224. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The storage device 208 is a non-transitory computer-readable storage medium, such as a hard drive, compact disk read-only memory (CD-ROM), DVD, or a solid-state memory device. The memory 206 holds instructions and data used by the processor 202. The video recording device 224 records objects that are within a field of view of the device 224 and creates video streams that include the recorded content. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 106.

As is known in the art, a computer 200 can have different and/or other components than those shown in FIG. 2. In addition, the computer 200 can lack certain illustrated components. For example, a computer system 200 acting as the identification system 104 may lack a keyboard 210, a pointing device 214, and a video stream device 224. Moreover, the storage device 208 can be local and/or remote from the computer 200 (such as embodied within a storage area network (SAN)).

The computer 200 is adapted to execute computer program modules for providing the functionality described herein. As used herein, the term "module" refers to computer program instruction and other logic for providing a specified functionality. A module can be implemented in hardware, firmware, and/or software. A module can include one or more processes, and/or be provided by only part of a process. A module is typically stored on the storage device 208, loaded into the memory 206, and executed by the processor 202.

The types of computer systems 200 used by the entities of FIG. 1 can vary depending upon the embodiment and the processing power used by the entity. For example, a user device 102 may be a mobile phone with limited processing power and a small display 218. The identification system 104, in contrast, may comprise multiple blade servers working together to provide the functionality described herein.

Figure 3:
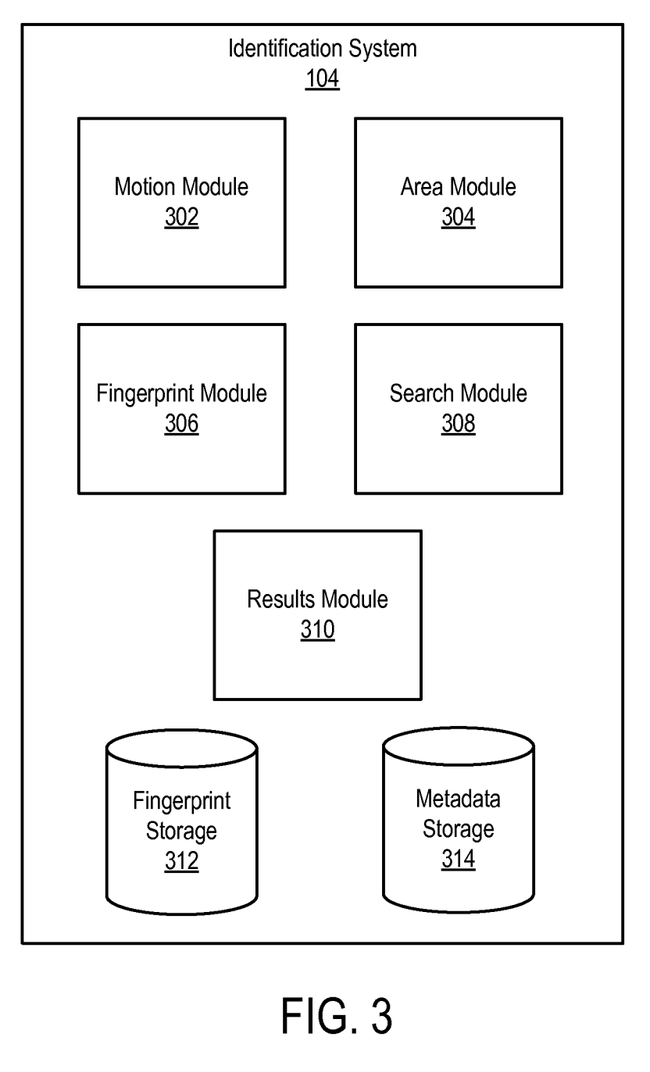
FIG. 3 is a block diagram illustrating modules operating within an identification system according to one embodiment.

FIG. 3 is a block diagram illustrating modules operating within the identification system 104 according to one embodiment. The identification system 104 includes a motion module 302, an area module 304, a fingerprint module 306, a search module 308, and a results module 310. The identification system 104 additionally includes a fingerprint storage 312 and a metadata storage 314. Those of skill in the art will recognize that other embodiments can have different and/or other modules than the ones described here, and that the functionalities can be distributed among the modules in a different manner.

The motion module 302 removes angular motion from video streams. When the identification system 104 receives a request for a video captured in a video stream to be identified, the motion module 302 analyzes the video frames of the stream for changes in camera angle/angular motion (vertical, horizontal and/or circular motion). Analysis of the video frames includes the motion module 302 comparing each frame of the stream with one or more frames immediately preceding it in the stream's sequence of frames. The motion module 302 determines whether vertical, horizontal, and/or circular motion occurred in the compared frame with respect to the one or more preceding frames. If vertical, horizontal, and/or circulation motion components are identified in the compared frame, the motion module 302 performs the necessary vertical, horizontal, and/or circular translation on the compared frame to remove the angular motion. Based on the translation of video frames that include angular motion, each frame of the stream appears to have been recorded by a stationary camera.

The area module 304 identifies display areas captured in video streams. After the motion module 302 removes angular motion from a stream capturing a video, the area module 304 analyzes the stream to identify a display area captured in the stream in which the video is displayed. The display area corresponds to the physical display in which playback of the video was displayed during the creation of the stream. For example, the display area may correspond to the display/screen of a television or a monitor. The display area needs to be identified so that it can be separated from the other portions of the stream and so that a fingerprint can be created that properly represents the video and not other content captured in the stream.

In one embodiment, the area module 304 identifies the top, bottom, left and right borders of the display area. To identify the top and bottom borders, the area module 304 analyzes each frame of the video stream from the top to the bottom (and/or bottom to the top) and identifies edges. These edges are referred to as top/bottom candidate edges.

For each top/bottom candidate edge, the area module 304 classifies the candidate edge as interesting or boring based on the variety of brightness in the pixels of the edge. An interesting edge will have a variety of brightness within the edge, where a boring edge will not. To classify a top/bottom candidate edge as interesting or boring, the area module 304 determines the brightness level of each of the edge's pixels. Based on the brightness levels of the pixels, the area module 304 calculates a median brightness value for pixels of the edge. The area module 304 determines the number of pixels in the edge whose brightness level is within a brightness threshold (e.g., within 5 values) of the median brightness and the number edge pixels whose brightness level is not within the brightness threshold of the median.

In one embodiment, the area module 304 classifies the edge as boring if the number of pixels whose brightness level is within the brightness threshold of the median is greater than number of pixels whose brightness level is not within the threshold of the median. Otherwise the area module 304 classifies the edge as interesting. In another embodiment, the area module 304 classifies the edge as boring if number of pixels whose brightness level is not within the brightness threshold of the median is greater than a certain number. Otherwise the area module 304 classifies the edge as interesting.

For each top/bottom candidate edge, the area module 304 compares the interesting/boring classification given to the same edge in each frame to merge the classifications. If the top/bottom candidate edge is given the same classification in each frame, the area module 304 assigns the same classification to the edge. For example, if in each frame the edge is given the classification of boring, the area module 304 assigns the boring classification to the edge. However, if the classification given to the top/bottom candidate edge varies in the different frames, the area module 304 selects one of the classifications. In one embodiment, the area module 304 assigns to the edge, the classification given to the edge in majority of the frames. For example, if in majority of the frames the edge was classified as interesting, the edge is assigned an interesting classification. In another embodiment, if the classification given to the edge varies, the area module 304 assigns a default classification (e.g., a boring classification).

In another embodiment, instead of identifying top/bottom candidate edge in each frame and classifying each edge in each frame, the area module 304 blends the frames of the video stream to generate a single blended frame. The area module 304 identifies top/bottom candidate edges in the blended frame and classifies each edge as interesting or boring.

In addition to classifying each top/bottom candidate edge as interesting or boring, the area module 304 also classifies each top/bottom candidate edge as tedious or exciting. Each top/bottom candidate edge is classified as tedious or exciting based on the variance of its pixels over time. Exciting edges have pixels that change over time, whereas tedious edges do not.

For each top/bottom candidate edge, the area module 304 determines the variance of each of the edge's pixels throughout the frames of the video stream. The area module 304 determines the number of pixels of the edge whose variance is less than a variance threshold (e.g., a value of 65) and the number of pixels whose variance is greater than the variance threshold. In one embodiment, the area module 304 classifies the top/bottom candidate edge as tedious if the number of pixels with variance less than the variance threshold is greater the number of pixels with variance greater than the threshold. Otherwise the area module 304 classifies the edge as exciting. In another embodiment, the area module 304 classifies the top/bottom candidate edge as tedious if the number of pixels with variance less than the variance threshold is greater than a certain number. Otherwise the area module 304 classifies the edge as exciting.

Based on the classifications of the top/bottom candidate edges, the area module identifies an approximate top border and an approximate bottom border. To identify the approximate top border, the area module 304 starts at the top of one the frames (e.g., Y value of zero of the first frame or a blended frame) and goes down the frame until it identifies a top/bottom candidate edge that has been classified as interesting and/or exciting. The area module 304 determines that the identified edge is the start of the display area because the edge has brightness variety (if classified as interesting) and/or varies over time (if classified as exciting). The area module 304 determines that the top/bottom candidate edge immediately above/before the identified edge on the Y-axis is the approximate top border.

The area module 304 performs the same process for the approximate bottom border but starts at the bottom of the frame and goes up until it identifies a top/bottom candidate edge classified as interesting and/or exciting. The area module 304 determines that the top/bottom candidate edge immediately below the identified edge on the Y-axis is the approximate bottom border. The area module 304 performs a Hough transform on the approximate top border and the approximate bottom border to identify the actual top border and bottom border of the display area.

To identify the left and right borders of the display area, the area module 304 rotates each frame of the video stream 90 degrees. The area module 304 repeats the process used for identifying the top and bottom border to identify the left and right borders. In other words, the area module 304 identifies left/right candidate edges, classifies each left/right candidate edges as interesting or boring, classifies each left/right candidate edge as tedious or exciting, identifies an approximate left border and right border, and performs a Hough transform on the approximate borders to identify the left and right borders.

The area module 304 interconnects identified top, bottom, left, and right borders. The area enclosed by the interconnected borders is the display area in which the video is displayed in the captured video stream.

In another embodiment, instead of identifying the display area by identifying borders as described above, the area module 304 identifies the display area by analyzing motions within areas/regions and motion outside of these areas. In this embodiment, the area module 304 identifies multiple candidate areas in the frames of the video streams. For each candidate area, the area module 304 analyzes the amount of motion within candidate area throughout the frames of the stream and the amount of motion outside of the candidate area throughout the frames. The area module 304 selects a candidate area with motion within the area but little or no motion outside of the area as being the display area which the video is displayed in the stream.

In one embodiment, to select the candidate area, the area module 304 determines for each candidate area a candidate score which is a measure indicative of the amount of motion within the candidate area compared to the amount of motion outside the area. In one embodiment, the greater the amount of motion within the candidate area compared to outside the candidate area, the greater the candidate score. From the multiple candidate areas, the area module 304 selects the candidate area with the greatest candidate score as being the display area.

The fingerprint module 306 creates fingerprints for videos. When the area module 304 identifies a display area captured in a video stream, the fingerprint module 306 creates a fingerprint for the display area. To create the fingerprint, the fingerprint module 306 identifies each frame of the stream in which the display area is included. For each identified frame, the fingerprint module 306 crops the frame to remove from the frame content included outside of the display area. In one embodiment, if necessary, the fingerprint module 306 also performs perspective distortion on the display area if necessary.

The fingerprint module 306 identifies content included in the display area of each identified frame. The identified content includes one or more scenes of the video captured in the stream. Based on the identified content, the fingerprint module 306 creates a fingerprint for the portion of the video captured in the video stream.

In one embodiment, to create the fingerprint, the fingerprint module 306 blurs together the identified content and finds maximally stable extremal regions. This results in the fingerprint module 306 generating a set of descriptors which it transforms into local quantized features. The local quantized features are turned into visterms, which are discrete representation of image characteristics and have weights. The weights of visterms are summed to produce the fingerprint.

The search module 308 searches for similar fingerprints in the fingerprint storage 312. The fingerprint storage 312 includes fingerprints for multiple videos. In one embodiment, the fingerprint storage 312 includes fingerprints of videos accessible from a video sharing system. Each fingerprint stored in the fingerprint storage 312 includes an identifier of a video to which the fingerprint corresponds.

For a fingerprint created by the fingerprint module 306 for a video, the search module 308 searches for fingerprints stored in the fingerprint storage 312 that are similar to the created fingerprint. The search module 308 identifies a certain number of fingerprints (e.g., one or three fingerprints) that are most similar to the created fingerprint. For each identified fingerprint, the search module 308 determines the video that corresponds to the fingerprint. The search module 308 provides identifiers of the videos that correspond to the identified fingerprints to the results module 310.

The results module 310 responds to requests from user devices 102 for identification of videos. When a request is received from a user device 102 for a video captured in a video stream to be identified, the results module 310 identifies any videos identified by search module 308 whose fingerprints are similar to the fingerprint created for the video captured in the stream.

The results module 310 determines for which of the identified videos to provide video information to the user device 102. In one embodiment, the results module 310 provides information about each video identified by the search module 308. In another embodiment, the results module 310 provides video information only for a select number of videos identified by the search module 308 (e.g., only for the identified video whose fingerprint is most similar to the fingerprint created by the fingerprint module 306).

For each identified video for which the results module 310 determines to provide video information, the results module 310 retrieves video information stored in the metadata storage 314 about the video. The metadata storage 314 includes video information about each video for which one or more fingerprints are included in the fingerprint storage 312. The video information stored in the metadata storage 314 for a video in one embodiment may include one or more of the following: an identifier of the video (e.g., name of the video), the name of the video's publisher, a description of the video, a URL link for accessing the video from a system hosting the video, a number of times the video has been watched, a number of times people indicated they liked the video, and a number of times people indicated that they did not like the video.

The results module 310 transmits instructions to the user device 102 to display the retrieved video information to the user of the device 102. In one embodiment, if video information is retrieved for a single video, the video information is displayed as being information about the video whose playback was captured in the video stream. On the other hand, if video information is retrieved for multiple videos, the video information for each video is displayed as potentially being information about the video whose playback was captured in the video stream.

Figure 4:
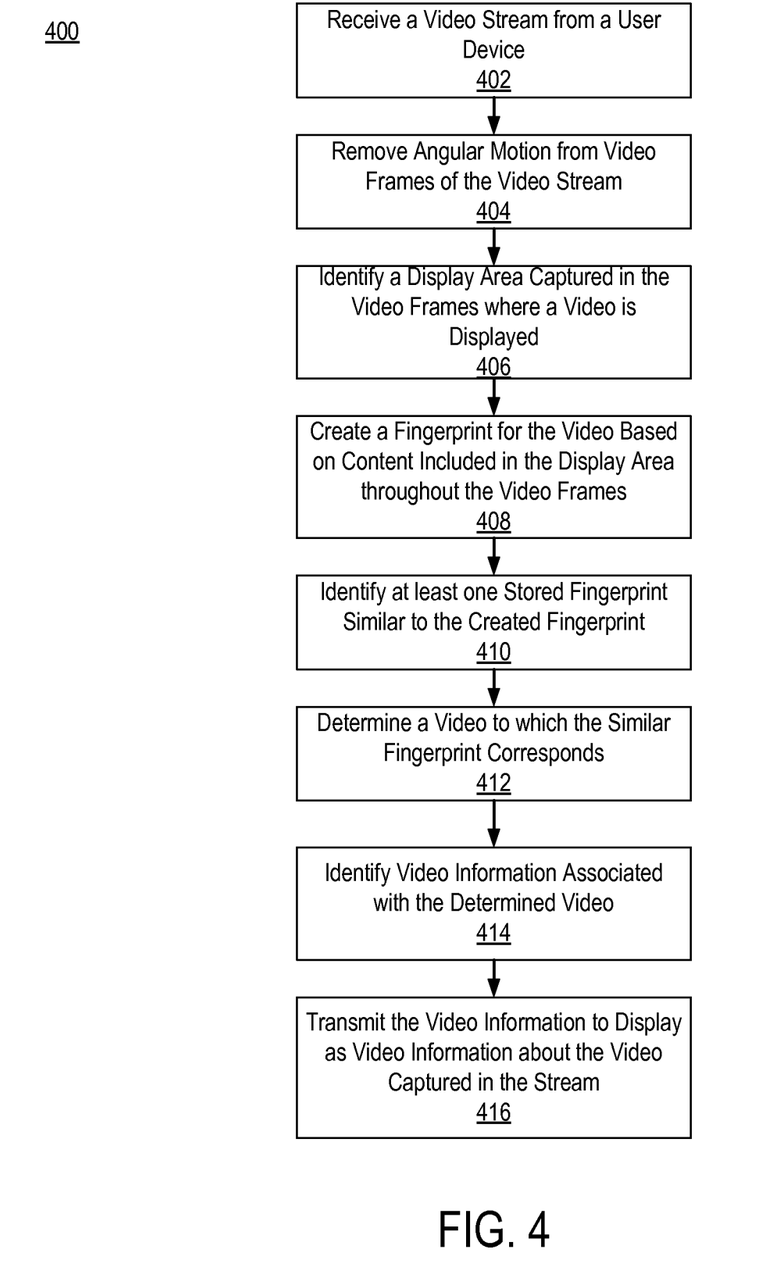
FIG. 4 is a flow chart illustrating operations of an identification system in identifying a video captured in a stream according to one embodiment.

FIG. 4 is a flow chart illustrating operations 400 of the identification system 104 in identifying a video captured in a stream according to one embodiment. Those of skill in the art will recognize that other embodiments can perform the steps of FIG. 4 in different orders. Moreover, other embodiments can include different and/or additional steps than the ones described herein.

Assume for purposes of this example that a user uses a user device 102 to create a video stream that captures playback of a video. The identification system 104 receives 402 the video stream from the user device 102 along with a request for the video to be identified.

The identification system 104 removes 404 angular motion from video frames of the stream that include angular motion components. The identification system 104 identifies 406 a display area captured in the video frames, where the video is displayed within the display area in the frames. The identification system 104 creates 408 a fingerprint for the video based on content included in the display area throughout the frames of the stream.

From multiple stored fingerprints, the identification system 104 identifies 410 at least one stored fingerprint similar to the created fingerprint. The identification system 104 determines 412 a video to which the similar fingerprint corresponds. The identification system identifies 414 video information associated with the determined video, such as the name of the video and information for accessing the video from a system hosting the video. The identification system 104 transmits 416 the video information to display to the user as video information about the video whose playback was captured in the stream.

The particular naming of the components, capitalization of terms, the attributes, data structures, or any other programming or structural aspect is not mandatory or significant, and the mechanisms that implement the embodiments described may have different names, formats, or protocols. Further, the systems may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain embodiments described herein include process steps and instructions described in the form of an algorithm. It should be noted that the process steps and instructions of the embodiments could be embodied in software, firmware or hardware, and when embodied in software, could be downloaded to reside on and be operated from different platforms used by real time network operating systems.

The embodiments described also relate to apparatuses for performing the operations herein. An apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present embodiments are not described with reference to any particular programming language. It is appreciated that a variety of programming languages may be used to implement the teachings of the embodiments as described herein.

The embodiments are well suited for a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the embodiments is intended to be illustrative, but not limiting.

The invention claimed is:

1. A computer-implemented method comprising:
receiving, by a computer system from a first device, a request to identify a video;
receiving, by the computer system from the first device, a video stream captured by the first device, the video stream capturing a second device displaying the video;
identifying, by the computer system from the video stream, a plurality of candidate edges, the plurality of candidate edges including more than four edges;
responsive to identifying the plurality of candidate edges, selecting, by the computer system from the plurality of candidate edges, four edges enclosing a display area in the video stream corresponding to the second device, each of the four edges selected based on brightness levels of a plurality of pixels corresponding to the edge;
creating, by the computer system, a fingerprint for the video based on content included in the display area;
identifying, by the computer system, video information based on the created fingerprint; and
transmitting, by the computer system to the first device, instructions to display the video information.

2. The method of claim 1, wherein the second device is a display displaying the video.

3. The method of claim 1, wherein identifying video information based on the fingerprint comprises:
identifying, from a plurality of stored fingerprints, at least one stored fingerprint similar to the created fingerprint; and
identifying video information associated with the at least one stored fingerprint, the identified video information displayed as being information about the video captured in the video stream.

4. The method of claim 1, wherein the video information comprises a video identifier and a link for accessing information associated with the video.

5. A non-transitory computer-readable storage medium having computer-executable instructions which when executed by a processor cause the processor to perform steps comprising:
- receiving from a first device a request to identify a video;
- receiving from the first device a video stream captured by the first device, the video stream capturing a second device displaying the video;
- identifying a plurality of candidate edges from the video stream, the plurality of candidate edges including more than four edges;
- responsive to identifying the plurality of candidate edges, selecting, from the plurality of candidate edges, four edges enclosing a display area in the video stream corresponding to the second device, each of the four edges selected based on brightness levels of a plurality of pixels corresponding to the edge;
- creating a fingerprint for the video based on content included in the display area;
- identifying video information based on the created fingerprint; and
- transmitting to the first device instructions to display the video information.

6. The computer-readable storage medium of claim 5, wherein the second device is a display displaying the video.

7. The computer-readable storage medium of claim 5, wherein identifying video information based on the fingerprint comprises:
- identifying, from a plurality of stored fingerprints, at least one stored fingerprint similar to the created fingerprint; and
- identifying video information associated with the at least one stored fingerprint, the identified video information displayed as being information about the video captured in the video stream.

8. The computer-readable storage medium of claim 5, wherein the video information comprises a video identifier and a link for accessing information associated with the video.

9. A system comprising:
- one or more computer processors; and
- one or more non-transitory computer-readable storage mediums storing computer-executable instructions which when executed by the one or more processors cause the one or more processors to perform steps comprising:
  - receiving from a first device a request to identify a video;
  - receiving from the first device a video stream captured by the first device, the video stream capturing a second device displaying the video;
  - identifying a plurality of candidate edges from the video stream, the plurality of candidate edges including more than four edges;
  - responsive to identifying the plurality of candidate edges, selecting, from the plurality of candidate edges, four edges enclosing a display area in the video stream corresponding to the second device, each of the four edges selected based on brightness levels of a plurality of pixels corresponding to the edge;
  - creating a fingerprint for the video based on content included in the display area;
  - identifying video information based on the created fingerprint; and
  - transmitting to the first device instructions to display the video information.

10. The method of claim 1, wherein selecting the four edges comprises:
for each of the four edges:
- determining a median brightness of the plurality of pixels corresponding to the edge;
- determining, from the plurality of pixels corresponding to the edge, a number of pixels whose brightness level is not within a brightness threshold of the median brightness; and
- selecting the edge based on the determined number of pixels whose brightness level is not within the brightness threshold.

11. The method of claim 10, wherein the edge is selected based on the determined number being less than a set number.

12. The method of claim 1, wherein selecting the four edges comprises:
for each of the four edges:
- determining a median brightness of the plurality of pixels corresponding to the edge;
- determining, from the plurality of pixels corresponding to the edge, a number of pixels whose brightness level is not within a threshold of the median brightness;
- determining, from the plurality of pixels corresponding to the edge, a number of pixels whose brightness level is within the threshold of the median brightness;
- selecting the edge based on the determined number of pixels whose brightness level is not within the threshold and the determined number of pixels whose brightness level is within the threshold.

13. The method of claim 12, wherein the edge is selected in response to determined number of pixels whose brightness level is not within the threshold being greater than the determined number of pixels whose brightness level is within the threshold.

14. The method of claim 1, wherein selecting the four edges comprises:
- selecting each of the four edges based on variance of the plurality of pixels corresponding to the edge throughout the video stream.

15. The method of claim 1, wherein selecting the four edges comprises:
for each of the four edges:
- determining, from the plurality of pixels corresponding to the edge, a number of pixels whose variance throughout the video stream is less than a threshold;
- selecting the edge based on the determined number of pixels.

16. The method of claim 15, wherein the edge is selected based on the determined number being less than a set number.

17. The method of claim 1, wherein selecting the four edges comprises:
for each of the four edges:
- determining, from the plurality of pixels corresponding to the edge, a number of pixels whose variance throughout the video stream is less than a threshold;
- determining, from the plurality of pixels corresponding to the edge, a number of pixels whose variance throughout the video stream is greater than the threshold;
- selecting the edge based on the determined number of pixels whose variance is greater than a threshold being more than the determined number of pixels whose variance is less than a threshold.

\* \* \* \* \*